(12) United States Patent
Rowe

(10) Patent No.: US 7,728,460 B2
(45) Date of Patent: Jun. 1, 2010

(54) POWER SUPPLY SYSTEM

(75) Inventor: Andrew Desmond Rowe, Bodmin (GB)

(73) Assignee: Lightpower Expo Limited, Conventry (GB)

( * ) Notice: Subject to any disclaimer, the term of this patent is extended or adjusted under 35 U.S.C. 154(b) by 174 days.

(21) Appl. No.: 12/027,288

(22) Filed: Feb. 7, 2008

(65) Prior Publication Data

US 2008/0191554 A1 Aug. 14, 2008

(51) Int. Cl.
- *H01B 7/30* (2006.01)
- *H01B 11/02* (2006.01)
- *H02B 1/20* (2006.01)
- *H02G 5/06* (2006.01)

(52) U.S. Cl. .................................... 307/147
(58) Field of Classification Search ................... 307/42, 307/147
See application file for complete search history.

(56) References Cited

U.S. PATENT DOCUMENTS

| | | | |
|---|---|---|---|
| 4,429,934 A | 2/1984 | VandenHoek et al. | |
| 4,470,232 A | 9/1984 | Condevaux et al. | |
| 4,781,609 A | 11/1988 | Wilson et al. | |
| 5,252,086 A | 10/1993 | Russell et al. | |
| 5,511,348 A * | 4/1996 | Cornell et al. | ................. 52/239 |
| 6,497,075 B1 * | 12/2002 | Schreiner et al. | ............. 52/36.1 |

FOREIGN PATENT DOCUMENTS

| | | |
|---|---|---|
| GB | 2080047 A | 1/1982 |
| GB | 2390232 A | 12/2003 |
| WO | WO 91/07791 | 5/1991 |

* cited by examiner

*Primary Examiner*—Albert W Paladini
*Assistant Examiner*—Carlos Amaya
(74) *Attorney, Agent, or Firm*—Gordon & Jacobson, PC

(57) ABSTRACT

A power supply system (and method) for an exhibition stand having a frame that includes upstanding posts and transverse members. The power supply system (and method) includes an elongate member forming in use one of the transverse members of the frame. The elongate member includes a power inlet connectable to a power supply, a power outlet, and a circuit connecting the power inlet and power outlet. The power supply system (and method) also includes a power take off unit having a power inlet and at least two power outlets, and a plurality of electrical connecting means. The power outlet of the elongate member can be connected by means of one of the electrical connecting means to the power inlet of the power take-off unit such that power can be tapped from the elongate member and directed from one power outlet of the take-off unit, via another of the electrical connecting means, to the elongate member of an adjacent exhibition stand. Power can also be directed from another power outlet of the take-off unit, via a further one of the electrical connecting means, to a desired portion of the exhibition stand.

16 Claims, 4 Drawing Sheets

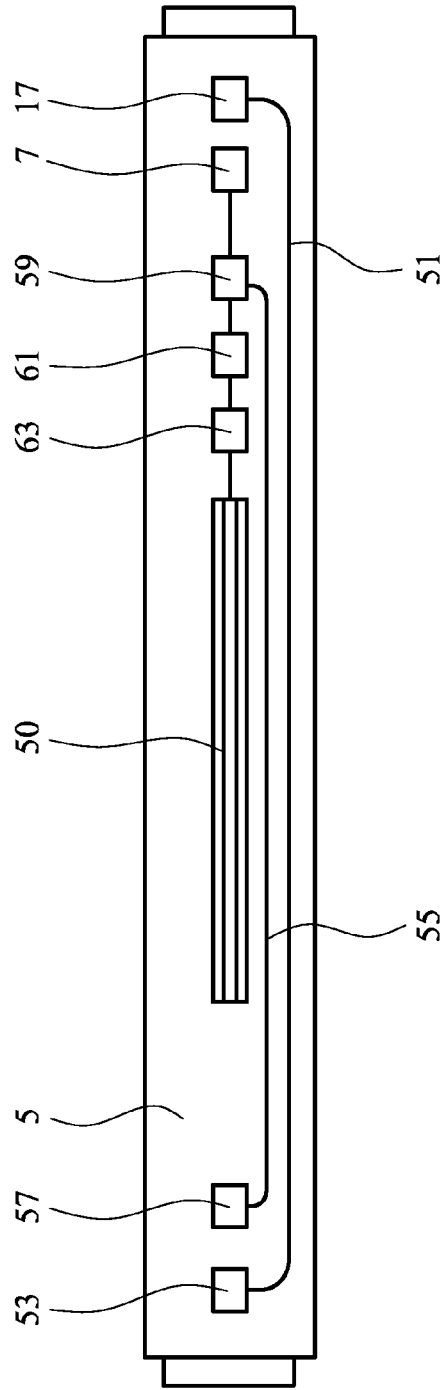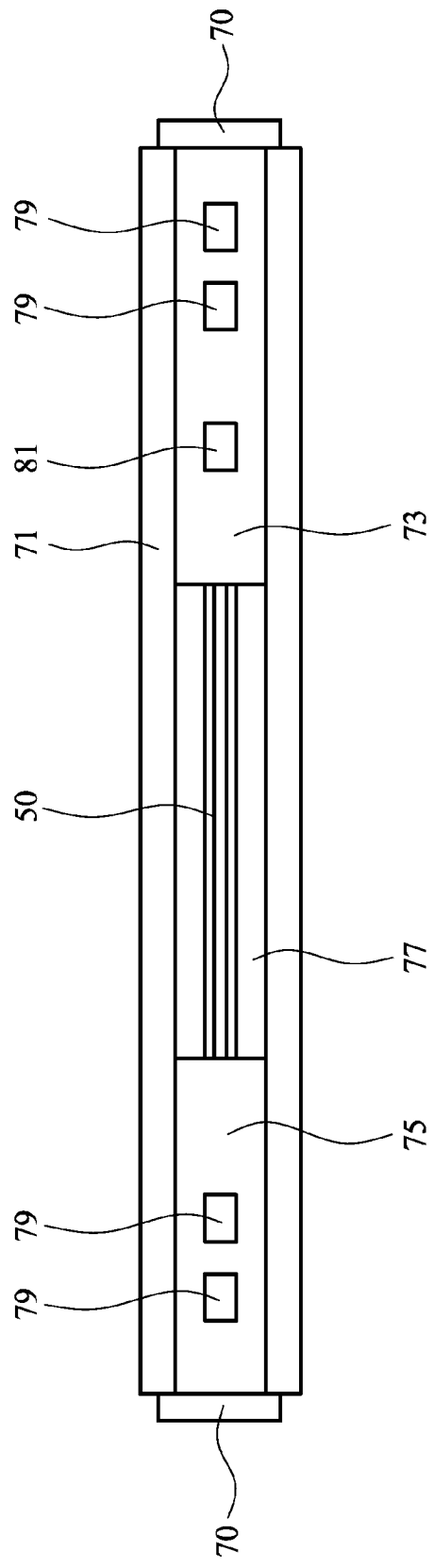

POWER SUPPLY SYSTEM

CROSS-REFERENCE TO RELATED APPLICATIONS

This application claims benefits from U.K Patent Application No. GB702499.5, filed Feb. 9, 2007, the contents of which are hereby incorporated by reference in its entirety.

BACKGROUND OF THE INVENTION

1. Field of the Invention

This invention relates broadly to power supply systems. More particularly, this invention relates to power supply systems for exhibition stands.

2. State of the Art

Exhibitions typically employ a large number of stands located in an open hall. The term exhibition is intended to include events such as trade fairs, wedding fairs etc. The size, type and arrangement of the stands within the hall will vary depending on the requirements of individual exhibitors, the number of exhibitors and also on the subject of the exhibition. The stands are temporary structures which are erected for each exhibition to the specifications of the exhibitor and in the designated position in the hall. Immediately after the exhibition the stands are dismantled and removed from the hall. This leads to a particular problem with the provision of a power supply to each stand for lighting the stand and providing a power supply for use by the exhibitors in the stand.

The established way of dealing with this problem is for each stand, once constructed, to be wired-up by a qualified electrician and connected to the main electricity supply of the exhibition hall. Once the exhibition is finished and before the stand can be dismantled the electrical wiring, which has of course been cut to fit the particular stand and exhibitors requirements, is ripped out and disposed of. There is thus a considerable amount of wastage as the wiring is not reused but is disposed of. In addition the exhibitor must pay the costs of the qualified electrician for each stand as well as the extra rent for the period whilst the stand is waiting to have the wiring fitted, is having the wiring fitted, is waiting to have the wiring removed at the end of the exhibition and is having the wiring removed.

GB 2390232 discloses an electrical supply system for an exhibition stand having an electrical bus bar with power outlets along its length to which electrical components can be plugged in to provide lighting and power sockets.

SUMMARY OF THE INVENTION

The present invention provides a flexible power supply system for an exhibition stand which can be installed and removed quickly and easily using relatively unskilled labor whilst providing a wide range of power supply options for the user.

The present invention also provides a power supply system that is substantially reusable, avoiding wastage and the associated environmental and financial costs.

According to the present invention, a power supply system is provided for an exhibition stand having a frame that includes upstanding posts and transverse members. The power supply system includes an elongate member forming in use one of the transverse members of the frame. The elongate member includes a power inlet connectable to a power supply, a power outlet, and a circuit connecting the power inlet and power outlet. The power supply system also includes a power take off unit having a power inlet and at least two power outlets, and a plurality of electrical connecting means. The power outlet of the elongate member can be connected by means of one of the electrical connecting means to the power inlet of the power take-off unit such that power can be tapped from the elongate member and directed from one power outlet of the take-off unit, via another of the electrical connecting means, to the elongate member of an adjacent exhibition stand. Power can also be directed from another power outlet of the take-off unit, via a further one of the electrical connecting means, to a desired portion of the exhibition stand.

Preferably, the exhibitor can operate a switch to disconnect the power supply to the exhibition stand without disrupting the power supply to an adjacent exhibition stand.

Preferably, the power take-off unit and/or the junction unit engage with a transverse member of the frame for ease of assembly. More preferably, the power take-off unit and/or the junction unit are slidably engageable with a transverse member of the frame so they can quickly and easily be slid to the required position on the frame and fixed into position using the retaining means. The position of these units can be easily adjusted if required.

The present invention also relates to an exhibition stand having a frame that includes upstanding posts and transverse members. The exhibition stand also includes a power supply system having an elongate member forming one of the transverse members of the frame. The elongate member includes a power inlet connectable to a power supply, a power outlet, and a circuit connecting the power inlet and power outlet. The power supply system also includes a power take off unit having a power inlet and at least two power outlets, and a plurality of electrical connecting means. The power outlet of the elongate member can be connected by means of one of the electrical connecting means to the power inlet of the power take-off unit such that power can be tapped from the elongate member and directed from one power outlet of the take-off unit, via another of the electrical connecting means, to the elongate member of an adjacent exhibition stand. Power can also be directed from another power outlet of the take-off unit, via a further one of the electrical connecting means, to a desired portion of the exhibition stand.

The exhibition stand enables a relatively unskilled person to quickly and easily install lighting elements and adjust the positioning of such lighting elements if required. The term lighting track is intended to mean a metal track through which current is conducted, the track having an elongate gap between two metal elements wherein lighting fixtures can inserted into the gap and releasably connected to the metal track by twisting. Lighting fixtures can thus be connected at any point along the metal track. Preferably, the lighting track is integral to the elongate member such that the lighting track cannot be removed from the elongate member when the elongate member is connected to and between the upstanding posts. Preferably, the light track includes a lighting circuit having a lighting power outlet which enables a connection to be made and lighting power to be provided to for example, an adjoining exhibition stand.

The elongate member of the exhibition stand may included a separate power supply circuit which supplies power for devices other than lighting.

The invention also relates to a method for supplying power to an exhibition stand as described herein.

Additional objects and advantages of the invention will become apparent to those skilled in the art upon reference to the detailed description taken in conjunction with the provided figures.

BRIEF DESCRIPTION OF THE DRAWINGS

FIG. 3 shows a plan view of the circuitry in an elongate member.

FIG. 4 shows a plan view of an elongate member.

DETAILED DESCRIPTION

Figure 1:
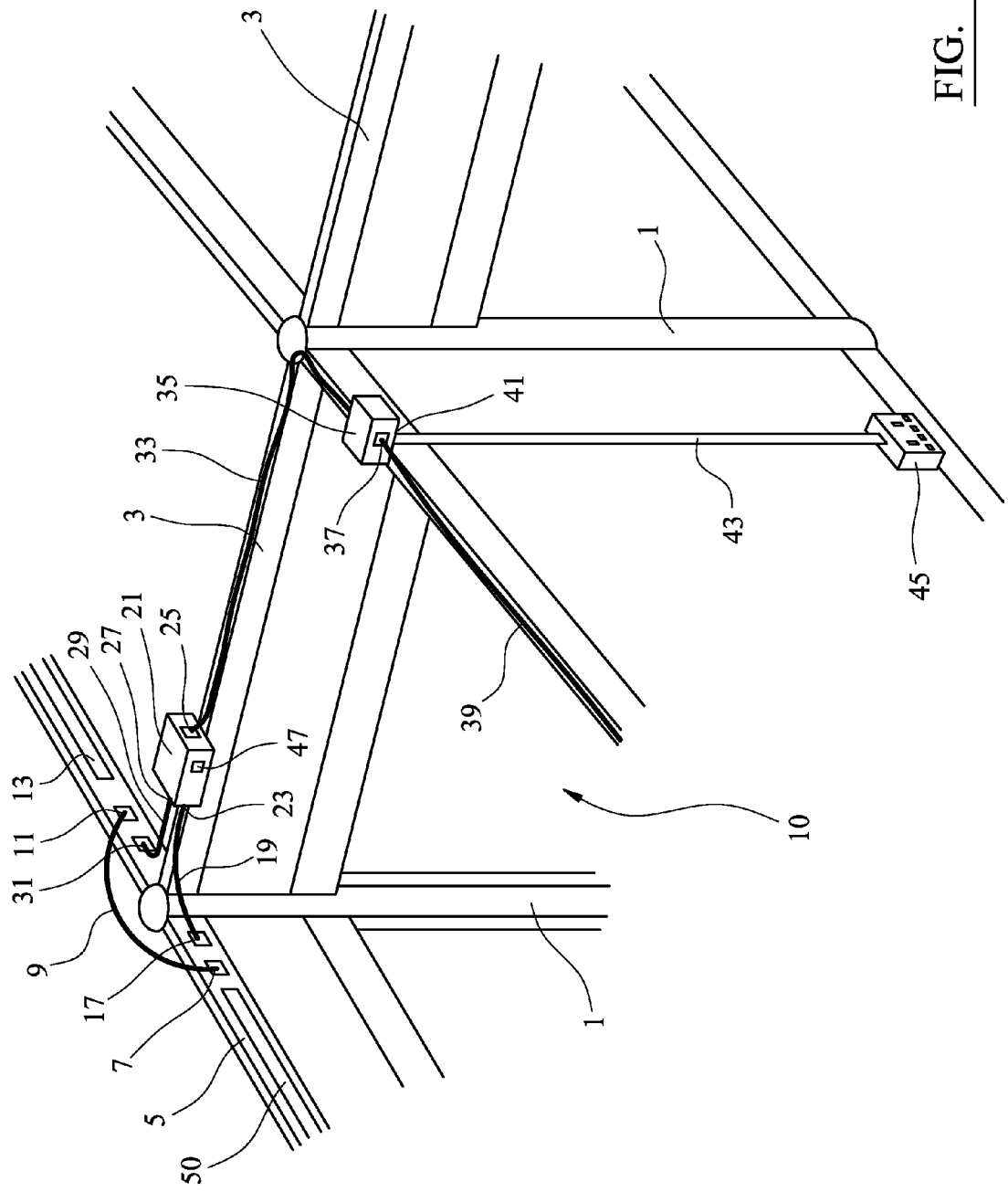
FIG. 1 shows the system of the invention installed in an exhibition stand.
Figure 2:
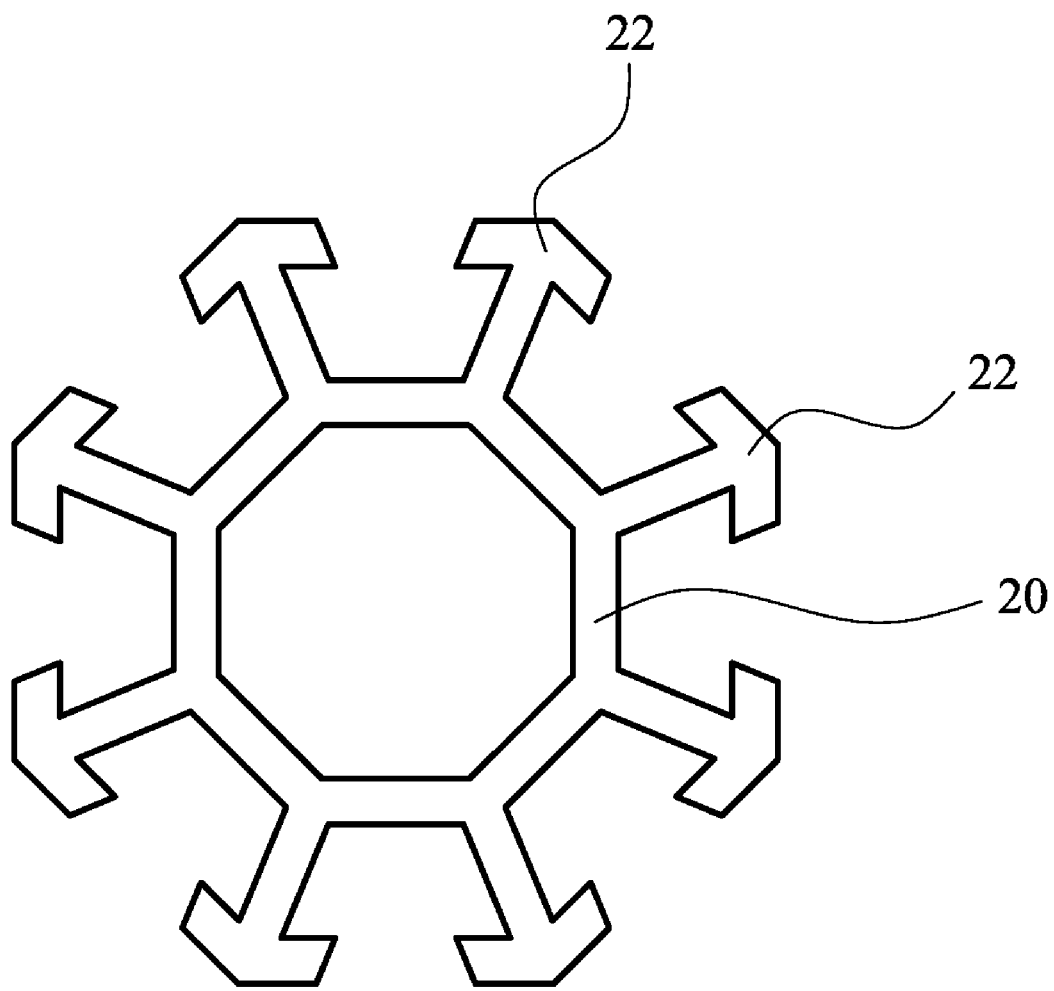
FIG. 2 shows a cross section through an upstanding post.

Referring to FIG. 1, an exhibition stand 10 includes upstanding posts 1 and transverse members 3 releasably connected to the upstanding posts 1. The upstanding posts are typically formed of extruded aluminum. FIG. 2 shows a typical cross section of a post member, which includes a central core 20 surrounded by eight equidistantly spaced T-shaped elements 22 to which transverse members 3, wall panels or display elements can be connected. The transverse members include hinged jaws to fit either side of one of the T-shaped elements of the upstanding post 5. The jaws can be drawn together to grip the upstanding post by tightening a bolt that connects the jaws to firmly connect the transverse member to the upstanding post.

Returning to FIG. 1, one of the transverse members of the frame is an elongate member 5. The elongate member 5 is described in more detail with reference to FIGS. 3 and 4. The elongate member 5 includes a set of jaws at either end to enable it to be releasably connected to post 1. The elongate member also includes a lighting track 50.

Elongate member 5 includes a first power outlet 7 in the form of a female socket into which a male plug on electrical cable 9 is inserted. The other end of electrical cable 9 has a male plug and is connected into the female socket of power inlet 11 in the elongate member 13 of the adjoining stand.

Elongate member 5 further includes a second power outlet 17 in the form of a female socket. Cable 19 has a male plug on one end, the male plug being connected into the power outlet 17. The other end of the cable 19 is connected into the power inlet 23 of power take-off unit 21. The power take-off unit 21 is positioned on and engaged with one of the transverse members 3 of the frame.

The power take-off unit further includes two power outlets 25 and 27. Power outlet 27 is connected via cable 29 to the power inlet 31 of elongate member 31. Power outlet 25 is connected by cable 33 to junction unit 35.

The power-take-off unit includes a switch 47 which is operable to prevent current flowing from outlet 25 so the exhibitor can control the power supply into the stand. Switch 47 does not affect the power outlet 27 so the exhibitor of stand 10 cannot unintentionally disconnect the power supply to the elongate member 13 of the adjoining stand.

Junction unit 35 is positioned on and engaged with a transverse member of the frame. Junction unit 35 includes a power outlet 37 connected to cable 39. The connection may be fixed or a releasable plug and socket connection. Junction unit 35 further includes a power outlet 41. A cable (not visible) connected to power outlet 41 passes through a substantially rigid tube 43 and connects to double socket unit 45 into which the required devices can be plugged in by the exhibitor. For clarity of illustration the rigid tube 43 and double socket unit 45 are shown positioned in an adjoining stand rather than in stand 10.

Cable 39 can be connected to a further junction unit to enable the provision of a further socket unit if required by the exhibitor.

FIG. 3 shows a plan schematic view of the circuitry supported by the elongate member 5 which includes two sixteen amp circuits 51 and 55. Circuit 51 runs between a power inlet 53 (preferably in the form of a female socket) and power outlet 17 (also preferably in the form of a female socket). To provide power to the circuit 51 of the elongate member, a connecting means (preferably in the form of a cable) is connected to a power source and has a mating male connector for insertion into the female socket of the power inlet 53. As shown in FIG. 1 the power outlet 17 is connected to a power take-off unit via cable 19.

Power is supplied to second circuit 55 by connecting a power source to power inlet 57 (which is preferably a female socket). Four amps of current is tapped off from circuit 55 to power lighting track 50. Positioned between the lighting track 50 and the tap off point 59 are a resettable circuit breaker 61 and switch 63. The exhibitor can control the power supply to the lighting track 50 by switch 63.

The remainder of the current from circuit 55 flows to outlet 7 where, as shown in FIG. 1, it is connected to the elongate member of an adjoining stand and powers the lighting track of the adjoining stand.

FIG. 4 shows a plan view of a particular embodiment of the elongate member 5. The elongate member has jaw elements 70 at each end for releasably connecting to the upstanding posts 1. The elongate member is realized from an elongate extrusion 71 (preferably aluminum) which is substantially U-shaped in cross section. Three extruded elements 73, 75 and 77 slidably engage with the extrusion 71 and are preferably aluminum. Elements 73 and 75 are cut-away portions 79 so the connectors can engage with the power inlet and outlet sockets. Element 73 also is a cut-away portion 81 to provide access to the switch 63 for the user. Element 77 is a lighting track 50.

The lighting track 50 can include a separate extruded element that is fitted inside extrusion element 77. Alternatively, element 77 can be configured so that the means making up a lighting track can be directly received in and connected to element 77 without requiring a separate extrusion to be inserted into element 77.

The lighting track 50 is preferably integral with the elongate member such that the lighting track cannot be removed from the elongate member when the elongate member is connected to and between the upstanding posts.

In a further embodiment the three elements 73, 75 and 77 may be formed as a single element. The lighting track may be directly connected to and received in the single element.

Once assembled the extrusion 71 and elements 73, 75 and 77 form an elongate hollow member.

Figure 5:
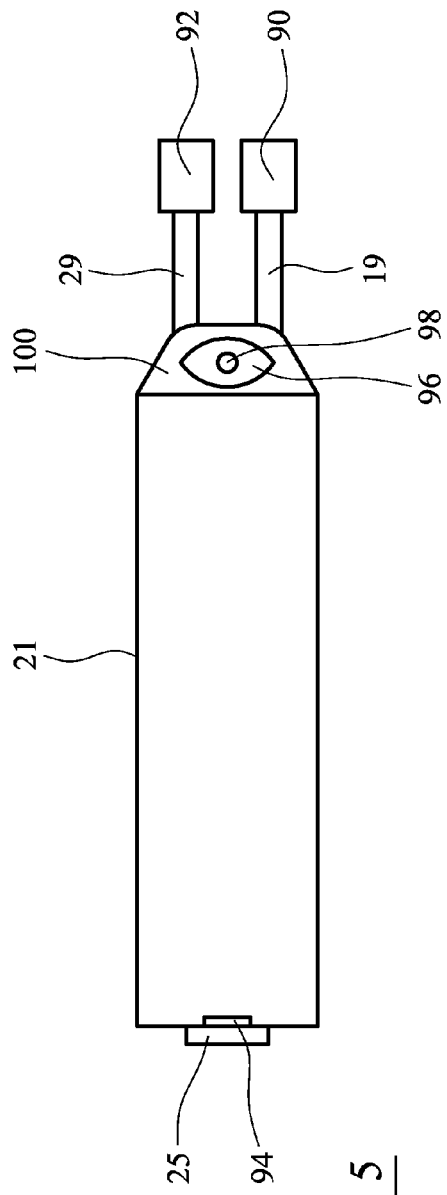
FIG. 5 shows the underside of a power take-off unit.

FIG. 5 shows the underside of a particular embodiment of a power take-off unit. As shown in FIG. 5 the power take-off unit includes a power outlet 25 in the form of a female socket, a power outlet 23 (not visible) to which cable 19 is fixedly connected and power outlet 27 (not visible) to which cable 29 is fixedly connected. Cables 19 and 29 are male connectors 90 and 92 respectively.

The power take-off unit and the transverse member are provided with complementary engaging means. The power take-off unit includes engaging means in the form of flange 94 and retaining means in the form of flange 96 which is fixed on to and rotates with grub screw 98 or other rotating means. The flange 96 and grub screw 98 are positioned on lip 100 which extends beyond the length of the main body of the power take-off unit so the grub screw can be accessed from above when the power take-off unit is engaged with a frame member.

Figure 6:
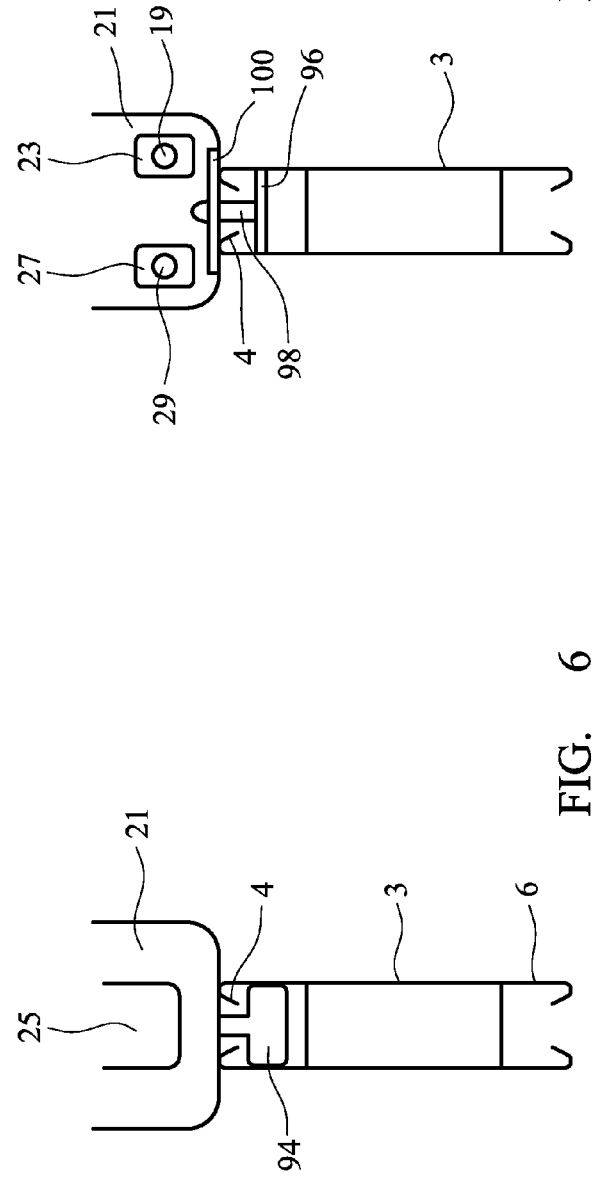

FIG. 6 shows how the flange 94 engages with a transverse member 3 of the frame. The upper portion of the transverse member 3 is substantially U-shaped in cross section. The flange 94 fits into and can slide along within the U-shaped cavity. The downwardly extending portions 4 of the upper portion of the transverse member 3 prevent the flange from being lifted out of the cavity and retain the power take-off unit in slidable engagement with the transverse member. The lower portion of the transverse member 6 can be engaged with a further element such as a partition board or other frame member.

Figure 7:
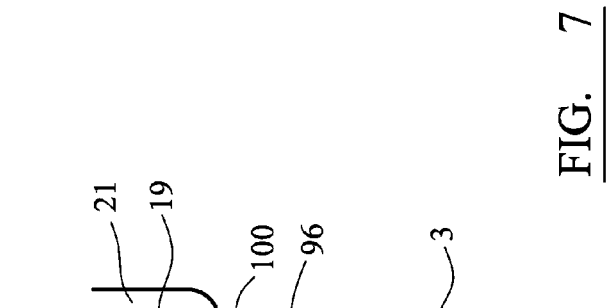
FIGS. 6 and 7 show a cross-sectional representation of the power take-off unit engaging with a transverse member of the frame.

FIG. 7 shows how the rotatable flange 96 can be engaged with and in the upper portion of the transverse member 3. The rotatable flange 96 is shaped so that it is smaller in width in one orientation than in another. The flange is oriented by rotating the grub screw 98 so that it is aligned with and can be slid into the upper portion of the transverse member 3. Once the flange 96 is engaged with the transverse member the power take-off unit can be slid along to a desired position. The downwardly extending portions of the upper portion of the transverse member 3 prevent the flange 96 from being lifted out of the cavity and retain the power take-off unit in slidable engagement with the transverse member. Once the desired position is reached the grub screw 98 can be rotated so that the flange 96 is brought into frictional engagement with the walls of the upper portion of the transverse member thereby retaining the power-take off unit in position and preventing it sliding along the transverse member. To enable the power take-off unit to slide the flange 96 is simply rotated.

The power socket connection unit may also include engaging means, complementary to those on the transverse member, in the form of a flange, such as the flange referred to as 94 above, which slidably engages with a frame element and may also include a retaining means in the form of a rotatable flange fixed to a grub screw, such as the flange and screw referred to as 96 and 98 above. As described above the flange 96 in one orientation is slidably engagable with a frame element and can be rotated to be brought into frictional engagement with the frame element so that the power socket connection unit is (releasably) fixed in position.

The electrical connection means, which may be in the form of flexible cables as shown in the illustrated embodiment, may have a fixed connection with one of the components making up the power supply system of the invention. Alternatively or in addition one or more of the connection means may have two male connectors, two female connectors or one of each, depending on requirements, to connect into the corresponding mating connector on the required component.

Although the elongate member, power take-off unit and junction unit have been illustrated and described with a particular number of power inlets and outlets the present invention is intended to cover systems where any one or more of those components include additional power inlets and/or outlets.

Although a double power socket unit is illustrated at 45, the unit can include one or more power sockets.

It is also envisaged that the elongate member could include data transfer means such as a data circuit to which data cables could be connected in a similar manner to the power circuits described above.

An exhibition stand or power supply system for an exhibition stand according to the invention may include more than one elongate member.

Two or more embodiments as described and illustrated herein may be combined and the invention is intended to cover such combinations.

There have been described and illustrated herein several embodiments of a system and method for supplying power to an exhibition stand. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A power supply system for an exhibition stand having a frame that includes upstanding posts and transverse members, the power supply system comprising:

an elongate member forming in use one of the transverse members of the frame;

the elongate member including a power inlet connectable to a power supply, a power outlet, and a circuit connecting to the power inlet and power outlet;

a power take-off unit having a power take-off unit power inlet and at least two power take-off unit power outlets; and a plurality of electrical connecting elements;

wherein the power outlet of the elongate member can be connected by means of one of the electrical connecting elements to the power take-off unit power inlet such that power can be tapped from the elongate member and directed from one power take-off unit power outlet, via another of the electrical connecting elements, to the elongate member of an adjacent exhibition stand;

wherein power can also be directed from another power take-off unit power outlet, via a further one of the electrical connecting elements, to a desired portion of the exhibition stand; and wherein the electrical connection between the power outlet of the elongate member and the power take-off unit power inlet is separate from the physical connection of the frame members.

2. A power supply system according to claim 1, wherein:
the power take-off unit comprises a switch operable to disconnect the power supply to the desired portion of the exhibition stand.

3. A power supply system according to claim 1, wherein:
the power supply system further comprises a junction unit having a power inlet, connectable to the power take-off unit via electrical connecting element, and at least two power outlets.

4. A power supply system according to claim 3, further comprising:
a power socket connection unit for connection to the junction unit via an electrical connecting element.

5. A power supply system according to claim 3, wherein:
the junction unit is engageable with a transverse member of the frame.

6. A power supply system according to claim 5, wherein:
the junction unit is slidably engageable with a transverse member of the frame and comprises retaining means operable to retain the power take-off unit in a fixed position on the transverse member.

7. A power supply system according to claim 1, wherein:
the power take-off unit is engageable with a transverse member of the frame.

8. A power supply system according to claim 7, wherein:
the power take-off unit is slidably engageable with a transverse member of the frame and comprises retaining means operable to retain the power take-off unit in a fixed position on the transverse member.

9. A power supply system according to claim 1, wherein:
the elongate member further comprises a second circuit for supplying power to lighting means.

10. An exhibition stand comprising:
a frame including upstanding posts and transverse members;
a power supply system including
an elongate member forming in use one of the transverse members of the frame, the elongate member including a power inlet connectable to a power supply, a power outlet, and a circuit connecting the power inlet and power outlet,
a power take-off unit having a power take-off unit power inlet and at least two power take-off unit power outlets, and
a plurality of electrical connecting elements,
wherein the power outlet of the elongate member can be connected by means of one of the electrical connecting elements to the power take-off unit power inlet such that power can be tapped from the elongate member and directed from one power take-off unit power outlet, via another of the electrical connecting elements, to the elongate member of an adjacent exhibition stand,
wherein power can also be directed from another power take-off unit power outlet, via a further one of the electrical connecting element, to a desired portion of the exhibition stand, and
wherein the electrical connection between the power outlet of the elongate member and the power take-off unit power inlet is separate from the physical connection of the frame members.

11. An exhibition stand comprising:
a frame having a plurality of upstanding elements;
a lighting system including an elongate member having an inlet configured to be connected to an electrical power supply, a power outlet and a circuit connecting the power inlet and the power outlet, the elongate member further configured to be releasably connectable to and extend between two of the upstanding elements of the frame;
wherein the elongate member comprises a separate lighting power inlet for connecting to an electrical power supply, a lighting track, and a lighting circuit configured to conduct electricity from the lighting power inlet to the lighting track.

12. An exhibition stand according to claim 11, wherein:
the lighting track is integral with the elongate member.

13. An exhibition stand according to claim 11, wherein:
the lighting circuit comprises a lighting power outlet.

14. An exhibition stand according to claim 11, wherein:
the elongate member comprises a circuit breaker between the lighting track and lighting power inlet.

15. An exhibition stand according to claim 11, wherein:
the elongate member comprises a switch between the lighting track and lighting power inlet.

16. A method of supplying power to an exhibition stand having a frame that includes upstanding posts and transverse members, the method comprising:
providing an elongate member having a power inlet, connectable to a power supply, a power outlet, and a circuit connecting the power inlet and power outlet;
providing a power take-off unit having a power take-off unit power inlet and at least two power take-off unit power outlets;
providing a plurality of electrical connecting elements;
releasably connecting the elongate member to and between the two of the upstanding posts;
connecting the power inlet of the elongate member to a power supply;
engaging the power take-off unit with a transverse member of the frame;
connecting the power outlet of the elongate member to the power take-off unit power inlet with an electrical connecting element, wherein the electrical connection between the power outlet of the elongate member and the power take-off unit power inlet is separate from the physical connection of the frame members; and
connecting one of the power take-off unit power outlets to an adjoining stand to provide power to that stand.

* * * * *